US011361315B2

(12) United States Patent
Vargas et al.

(10) Patent No.: US 11,361,315 B2
(45) Date of Patent: Jun. 14, 2022

(54) SYSTEMS AND METHODS FOR CARD AUTHORIZATION

(71) Applicant: Capital One Services, LLC, McLean, VA (US)

(72) Inventors: Cruz Vargas, Alexandria, VA (US); Andrea Montealegre, Arlington, VA (US); Daniel John Marsch, Arlington, VA (US); Sophie Bermudez, Washington, DC (US); William Carroll, Huntingtown, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 27 days.

(21) Appl. No.: 15/931,001

(22) Filed: May 13, 2020

(65) Prior Publication Data

US 2021/0357921 A1    Nov. 18, 2021

(51) Int. Cl.
  *G06Q 20/38*    (2012.01)
  *G06Q 20/34*    (2012.01)
  *G06K 19/077*    (2006.01)

(52) U.S. Cl.
  CPC ..... *G06Q 20/385* (2013.01); *G06K 19/07709* (2013.01); *G06Q 20/341* (2013.01)

(58) Field of Classification Search
  CPC ............................ G06Q 20/341; G06Q 20/358
  (Continued)

(56) References Cited

U.S. PATENT DOCUMENTS 5,180,901 A    1/1993 Hiramatsu
5,987,155 A    11/1999 Dunn et al.
(Continued)

FOREIGN PATENT DOCUMENTS

| AU | 2010217833 A1 | 10/2011 |
| AU | 2013252025 A1 | 12/2014 |
| AU | 2015201966 B2 | 10/2016 |

(Continued)

OTHER PUBLICATIONS

Authors: Jhawar, R.; Make mine a quadruple: Strengthening the security of graphical one-time PIN authentication; IEEE Conference Paper: Publication Date: Sep. 1, 2011 Conference Start Date: Sep. 6, 2011 Conference End Date: Sep. 8, 2011 (Year: 2011).*

(Continued)

*Primary Examiner* — Hani M Kazimi
*Assistant Examiner* — Hatem M Ali
(74) *Attorney, Agent, or Firm* — Hunton Andrews Kurth LLP

(57) ABSTRACT

Example embodiments of systems, methods, and computer-accessible mediums for transaction authorization are provided. An exemplary system can comprise a card including an input device and a display device in data communication with a server. The server can generate an authorization passcode upon an initiation of a transaction session, and the card can receive an entered passcode through the input device, display the entered passcode on the display device, and transmit the entered passcode to the server for comparison to the authorization passcode. Upon a determination that the entered passcode is a match for the authorization passcode, the server can transmit a match notification indicating the transaction session is valid, and upon a determination that the entered passcode is a mismatch for the authorization passcode, the server can transmit a mismatch notification terminating the transaction session.

20 Claims, 7 Drawing Sheets

(58) Field of Classification Search
USPC .......................................................... 705/41
See application file for complete search history.

(56) References Cited

U.S. PATENT DOCUMENTS

| | | | |
|---|---|---|---|
| 7,278,025 B2 | 10/2007 | Saito et al. | |
| 8,015,592 B2 | 9/2011 | Doughty et al. | |
| 10,438,106 B2 | 10/2019 | Breed et al. | |
| 2004/0179718 A1 | 9/2004 | Chou | |
| 2008/0120509 A1 | 5/2008 | Simon | |
| 2008/0296371 A1 | 12/2008 | Lu et al. | |
| 2009/0153297 A1 | 6/2009 | Gardner | |
| 2009/0322477 A1 | 12/2009 | Celorio | |
| 2014/0232525 A1 | 8/2014 | Mohmedi | |
| 2016/0247161 A1* | 8/2016 | Wang | G06F 21/31 |
| 2017/0300799 A1* | 10/2017 | Breed | G07F 7/1016 |
| 2018/0174013 A1 | 6/2018 | Lee | |
| 2018/0240117 A1* | 8/2018 | Rezayee | G07F 7/0873 |
| 2020/0104830 A1* | 4/2020 | Hart | G06Q 20/36 |

FOREIGN PATENT DOCUMENTS

| | | |
|---|---|---|
| CA | 2646239 C | 11/2012 |
| EP | 2355051 A1 | 8/2011 |
| EP | 3557482 A1 | 10/2019 |
| GB | 2500467 A | 9/2013 |
| GB | 2564655 A | 1/2019 |
| WO | 2002069281 A2 | 9/2002 |
| WO | 2014015386 A1 | 1/2014 |
| WO | 2017064097 A1 | 4/2017 |

OTHER PUBLICATIONS

Authors: D. J. Boyed et al: Single sign-on to the web with an EMV card: IEEE Conference Paper.: Last Update Date: Jul. 18, 2008 Publication Date: May 1, 2008 Conference Start Date: May 19, 2008 (Year: 2008).*

* cited by examiner

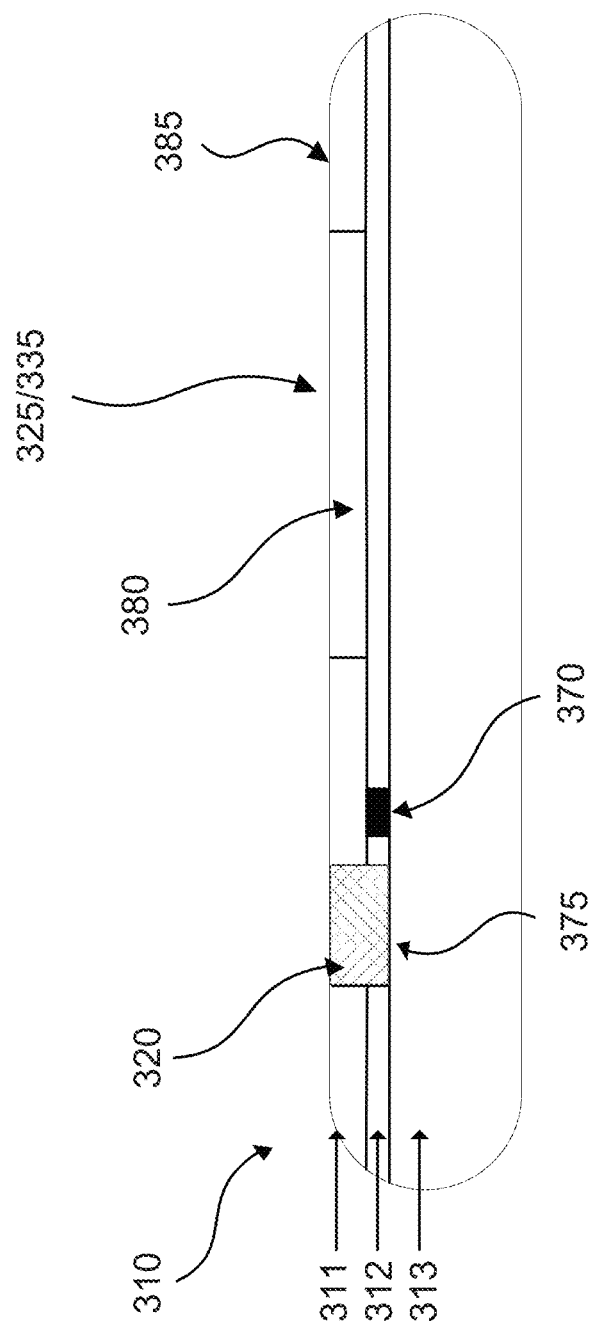

SYSTEMS AND METHODS FOR CARD AUTHORIZATION

FIELD OF THE INVENTION

The present disclosure relates to card authorization, and more particularly, to systems, methods, and computer-accessible mediums for card authorization.

BACKGROUND

Credit cards are nearly ubiquitous in society and can be involved in commercial and other transactions, such as purchases and other financial transactions. Credit cards often have high credit limits, such that very large purchase can be made using a credit card. However, the credit cards can require only possession of the card and signing a signature that approximately matches the signature on the back of the card, which provides a low level of transaction security and an opportunity for fraudulent activity. In many instances, a comparison of the signed signature and the signature on the back of the card is not performed, further reducing transaction security and increasing the potential for fraud.

Credit accounts can provide access to significant amounts of money, and unauthorized use of credit cards can present significant liability to consumers as well as to the financial institutions issuing the credit cards. Credit card fraud is a significant area of loss for both consumers and financial institutions, despite considerable prevention efforts already in place. Credit card fraud causes not only monetary losses, but also the loss of time and effort by consumers and financial institutions in the investigation of potentially fraudulent activity and the correction of fraudulent transactions. Financial institutions current commit significant resources to fraud prevention, investigation, and correction, yet fraudulent activity still occurs.

In addition, electronic commerce frequently involves the use of credit cards. Electronic transactions, such as online transactions, often involve the submission of credit card information by an application or through a webpage. In such transactions, there is no way to request a consumer submit a signature and to compare that signature to the signature on the back of the card. As electronic commerce continues to grow in popularity, and risk of fraud and incidents of fraudulent activity will continue to increase.

These and other deficiencies exist. Accordingly, there is a need to overcome these deficiencies and to provide consumers and financial institutions with increased security for credit card transactions while decreasing the risk of fraud.

SUMMARY

Aspects of the disclosed technology include systems, methods, and computer-accessible mediums for card-based transactions. Various embodiments describe systems, methods, and computer-accessible mediums for authorizing a transaction involving a card.

Embodiments of the present disclosure provide a card authorization system comprising: a card comprising a substrate, a processor, a memory, a communication interface, an input device, and a display device; and a server in data communication with the card, the server configured to generate an authorization passcode upon an initiation of a transaction session, wherein, upon the initiation of a transaction session, the card is configured to: receive an entered passcode through the input device, display the entered passcode on the display device, and transmit the entered passcode to the server; and wherein, upon receipt of the entered passcode, the server is configured to: compare the entered passcode to the authorization passcode, and upon a determination that the entered passcode is a match for the authorization passcode, transmit a match notification indicating the transaction session is valid, and upon a determination that the entered passcode is a mismatch for the authorization passcode, transmit a mismatch notification terminating the transaction session.

Embodiments of the present disclosure provide a method for authorizing a card comprising a substrate, a processor, a memory, a communication interface, an input device, and a display device, the method comprising: initiating, by the processor, a transaction session; receiving, by the input device, an initial passcode; receiving, by the input device, an edit to the initial passcode; creating, by the processor, an entered passcode in response to the edit to the initial passcode; transmitting, by communication interface, the entered passcode to a server; comparing, by the server, the entered passcode to an authorization passcode; generating, by the server and upon a determination that the entered passcode is a match for the authorization passcode, a match notification; and transmitting, by the server, the match notification.

Embodiments of the present disclosure provide a card comprising: a substrate comprising a plurality of layers, the plurality of layers including a piezoelectric layer; and a plurality of components embedded within the substrate, the plurality of components including a processor, a memory, a communication interface, an input device, and a display device, wherein: the processor is configured to initiate a transaction session, the input device comprises a plurality of keys configured to receive a user input, the plurality of keys including a deletion key for modifying the user input, the display device configured to display the user input, the communication interface is configured to transmit the user input and to receive at least one selected from the group of a match notification and mismatch notification, and upon receipt of the mismatch notification, the processor is further configured to terminate the transaction session.

Further features of the disclosed design, and the advantages offered thereby, are explained in greater detail hereinafter with reference to specific example embodiments illustrated in the accompanying drawings.

BRIEF DESCRIPTION OF THE DRAWINGS

FIGS. 3A, 3B, and 3C illustrate a card according to example embodiments.

DETAILED DESCRIPTION OF EXAMPLE EMBODIMENTS

Figure 1:
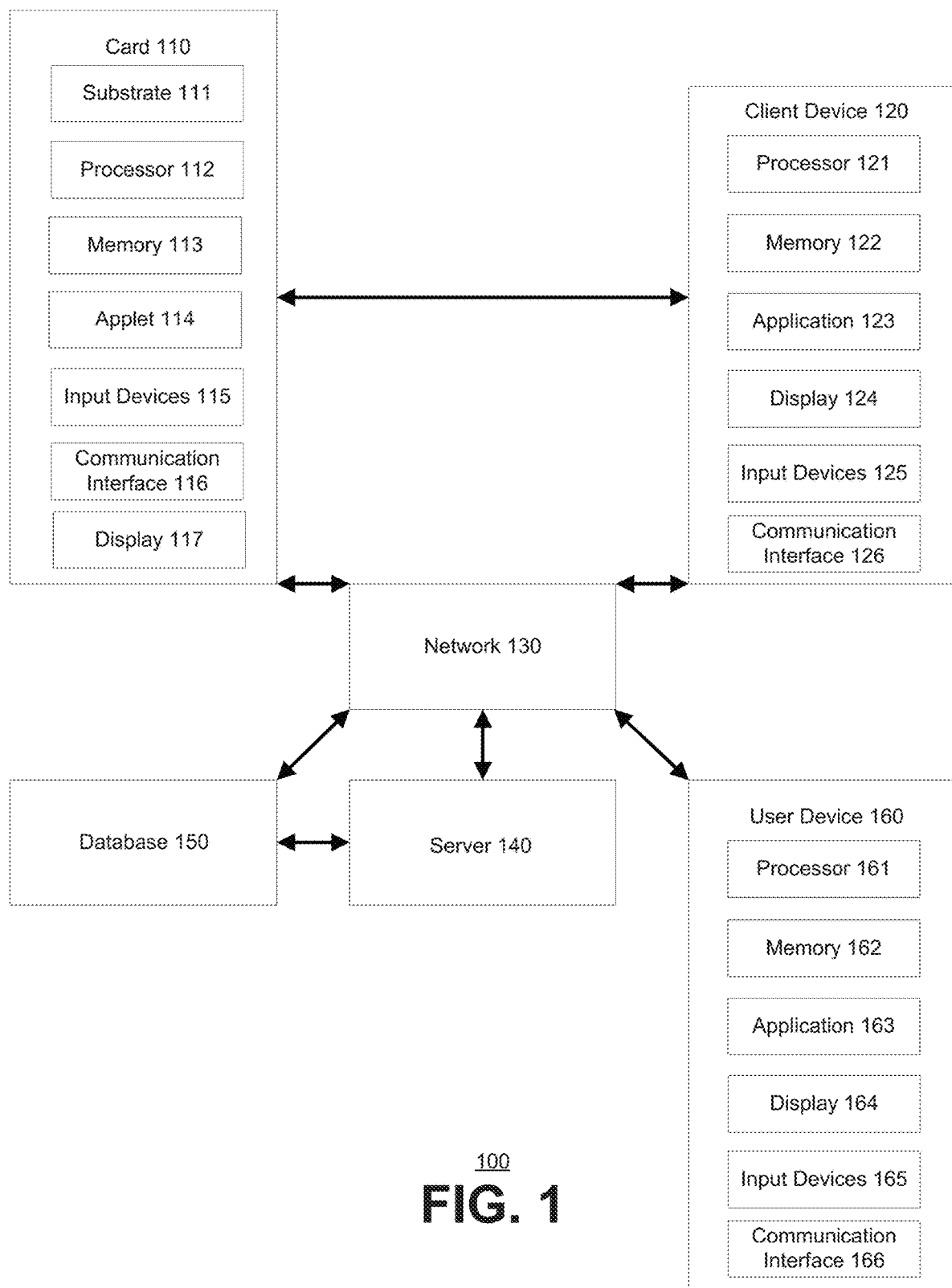
FIG. 1 illustrates a transaction authorization system according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems, methods, and computer-accessible mediums that promote transaction security for card-based transactions, including transactions that involve credit cards. Existing credit cards often include an account number an expiration date, and a card verification value (CVV). Many credit card transactions can be performed with either possession of the card or possession of this information, including online credit card transactions. Credit cards can also include a signature signed by the user in whose name the card has been issued as an additional security measure, but a similarly-written signature at the time of purchase can be sufficient to overcome this security measure, and often the signature signed at the time of purchase is not checked against the signature on the card. These security measures can be ineffective in stopping credit card fraud, and correcting fraudulent activity and investigating potentially fraudulent activity can require significant expenditures of time, resources, and money by users and the card-issuing institutions.

Example embodiments of the present disclosure can improve transaction security for card-based transactions by requiring the input of a passcode (e.g., a password, passcode, personal identification number (PIN)) prior to, during, and/or upon conclusion of a transaction. The passcode can be known only to the user and the issuing institution and its input into the card can be required to authorize a transaction. Without the input of the passcode, a transaction cannot be authorized, and this requirement reduce the occurrence of fraud and potentially fraudulent activity. By doing so, expenditures of time, resources, and money by users and issuing institutions directed to fraud prevention, investigation, and correction can be reduced and transaction security can be improved.

The passcode can be a series of characters (e.g., numbers, letters, and/or special characters) associated with the user, the card or with the corresponding account. This passcode does not need to include the private information of the user, such as an account number, a Social Security number, a birth date, a passport number, or a driver's license number. Thus, the use of a passcode can improve transaction security without creating the need to provide or transmit private information and accordingly without creating additional opportunities for the exposure and theft of private information.

FIG. 1 illustrates a transaction authorization system according to an example embodiment. As further discussed below, system 100 can include a card 110, a client device 120, a server 140, a database 150, and a user device 160 in communication via a network 130 or in communication directly with each other without utilizing network 130. Although FIG. 1 illustrates single instances of the components, system 100 can include any number of components.

As shown in FIG. 1, the system 100 includes a card 100. The card 110 can be a contact-based card or a contactless card. A contact-based card can include a magnetic stripe or a chip configured to communicate with a physical interface, such as by swiping through a card swipe interface or inserting into a card chip reader found on an automated teller machine (ATM) or other device configured to communicate over a physical interface. Exemplary other devices can include, without limitation, a mobile device, tablet, laptop computer, desktop computer, wearable device, kiosk, cash register, and payment terminal including a card swipe interface or a card chip reader or in communication with an external card swipe interface or card chip reader (e.g., via universal serial bus or other cable or a wireless data connection between the swipe interface or card reader and the device). A contactless card can communicate to a card reading device without the need for a physical interface. Instead, the contactless card can communicate with a contactless card reader or other device having a contactless communication interface. Exemplary other devices can include, without limitation, a mobile device, tablet, laptop computer, desktop computer, wearable device, a kiosk, a cash register, a payment terminal, and another contactless card. In some examples, the contactless card can communicate via near field communication (NFC), Bluetooth, Wi-Fi, radio-frequency identification (RFID), and other forms of wireless communication. Additional example embodiments of a card are described with reference to FIGS. 3A and 3B.

The card 100 may comprise a substrate 111, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the card 100 may have physical characteristics compliant with the ID-1 format of the ISO/IEC 7810 standard, and the card may otherwise be compliant with the ISO/IEC 14443 standard. However, it is understood that the card 100 according to the present disclosure may have different characteristics, and the present disclosure does not require the card 100 to be implemented in a payment card such as a credit card.

The card 100 can include a processor 112, a memory 113, an applet 114, an input device 115, a communication interface 116, and a display 117. The processor 112 can be a processor, a microprocessor, or other processor, and the card 110 can include one or more of these processors. The processor 112 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 111 can be coupled to the memory 113. The memory 113 can be a read-only memory, write-once read-multiple memory or read/write memory, e.g., RAM, ROM, and EEPROM, and card 110 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it can not be rewritten, but it can be read many times. A read/write memory can be programmed and re-programed many times after leaving the factory. It can also be read many times. The memory 113 can be configured to store one or more software applications and one or more applets, such as applet 114, and other data, such as private information.

The applet 114 can comprise one or more applets (e.g., Java Card applets) and/or one or more software applications comprising instructions for execution on the card 110. In some examples, card 110 can execute one or more applets or one or more applications that enable, for example, network communications with one or more components of system 100, transmit and/or receive data, and perform the functions described herein. Upon execution by the processor 112, the application 115 can provide the functions described in this specification, specifically to execute and perform the steps and functions in the process flows described herein. Such processes can be implemented in software, such as software modules, for execution by computers or other machines. The applet 114 can provide graphic user interfaces (GUIs) through which user can view and interact with other components and devices within system 100. The GUIs can be formatted, for example, as web pages in HyperText Markup Language (HTML), Extensible Markup Language (XML) or in any other suitable form for presentation on a display device depending upon applications used by users to interact with the system 100.

The input devices 115 can include any device for entering information into the card 110 that is available and supported by the card 110. Exemplary input devices include, without limitation, one or more buttons, a keypad, a touch screen, a touch pad, a stylus, a dial, a microphone, a camera, and a video recorder or camcorder. The input devices 115 can be used to enter information and interact with the software and components of the card 110 as well as other devices described herein. In some examples, the keys of the keypad can be physical buttons on the card that can be pressed, and in other examples the buttons can appear on a touch screen. For example, the user can press one or more keys of the keypad using a finger, a stylus, or other pointing device.

The communication interface 116 can include communication a capabilities with physical interfaces and contactless interfaces. For example, the communication interface can communicate with a physical interface, such as by swiping through a card swipe interface or inserting into a card chip reader found on an automated teller machine (ATM) or other device configured to communicate over a physical interface. In other examples, the communication interface 116 can establish contactless communication with a card reading device via a short-range wireless communication method, such as NFC, Bluetooth, Wi-Fi, RFID, and other forms of contactless communication. As shown in FIG. 1, the communication interface 116 can communicate directly with the client device 120 or communicate with client device 120, server 140, and database 150 via network 130.

The display 117 can include can be any type of device for presenting visual information such as a computer monitor, a flat panel display, and a mobile device screen, including liquid crystal displays, light-emitting diode displays, plasma panels, and cathode ray tube displays. In some examples, the display 117 and input devices 115 can be touch screens, and in some examples both the display 124 and the input devices 125 can contained within the same touch screen. For example, the display 124 and input devices 125 can comprise a capacitive touch screen, a resistive touch screen, or a combination thereof.

As shown in FIG. 1, the system 100 further includes a client device 120. The client device 120 can be a network-enabled computer device. Exemplary network-enabled computer devices include, without limitation, including, a server, a network appliance, a personal computer, a workstation, a phone, a handheld personal computer, a personal digital assistant, a thin client, a fat client, an Internet browser, a mobile device, a kiosk, an automated teller machine (ATM), a cash register, or other a computer device or communications device. For example, network-enabled computer devices can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, the client device can be a contact-based card or a contactless card.

The client device 120 can include a processor 121, a memory 122, an application 123, a display 124, input devices 125, and a communication interface 126. The processor 121 can be a processor, a microprocessor, or other processor, and the client device 120 can include one or more of these processors. The processor 121 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 121 can be coupled to the memory 122. The memory 122 can be a read-only memory, write-once read-multiple memory or read/write memory, e.g., RAM, ROM, and EEPROM, and client device can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times. The memory 122 can be configured to store one or more software applications, such as application 123, and other data, such as private information.

The application 113 can comprise one or more applets or one or more software applications comprising instructions for execution on the client device 120. In some examples, client device 120 can execute one or more applications, such as software applications, that enable, for example, network communications with one or more components of system 100, transmit and/or receive data, and perform the functions described herein. Upon execution by the processor 121, the application 123 can provide the functions described in this specification, specifically to execute and perform the steps and functions in the process flows described above. Such processes can be implemented in software, such as software modules, for execution by computers or other machines. The application 123 can provide graphic user interfaces (GUIs) through which user can view and interact with other components and devices within system 100. The GUIs can be formatted, for example, as web pages in HyperText Markup Language (HTML), Extensible Markup Language (XML) or in any other suitable form for presentation on a display device depending upon applications used by users to interact with the system 100.

The client device 120 can further include a display 124 and input devices 125. The display 124 can be any type of device for presenting visual information such as a computer monitor, a flat panel display, and a mobile device screen, including liquid crystal displays, light-emitting diode displays, plasma panels, and cathode ray tube displays. The input devices 125 can include any device for entering information into the client device 120 that is available and supported by the client device 120, such as a touch screen, keyboard, mouse, cursor-control device, touch screen, microphone, digital camera, video recorder or camcorder. These devices can be used to enter information and interact with the software and other devices described herein. In some examples, the display 124 and input devices 125 can be touch screens, and in some examples both the display 124 and the input devices 125 can contained within the same touch screen.

The communication interface 126 can include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client device 120 can also support a short-range wireless communication interface, such as NFC, RFID, and Bluetooth, through communication interface 126, along with radio transmissions.

System 100 can include one or more networks 130. In some examples, network 130 can be one or more of a wireless network, a wired network or any combination of wireless network and wired network, and can be configured to connect card 110, client device 120, server 140, and database 150. For example, network 130 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 130 can include, without limitation, telephone lines, fiber optics, IEEE Ethernet 902.3, a wide area network, a wireless personal area network, a LAN, or a global network such as the Internet. In addition, network 130 can support an Internet network, a wireless communication network, a cellular network, or the like, or any combination thereof. Network 130 can further include one network, or any number of the exemplary types of networks mentioned above, operating as a stand-alone network or in cooperation with each other. Network 130 can utilize one or more protocols of one or more network elements to which they are communicatively coupled. Network 130 can translate to or from other protocols to one or more protocols of network devices. Although network 130 is depicted as a single network, it should be appreciated that according to one or more examples, network 130 can comprise a plurality of interconnected networks, such as, for example, the Internet, a service provider's network, a cable television network, corporate networks, such as credit card association networks, and home networks. Network 130 can further comprise, or be configured to create, one or more front channels, which can be publicly accessible and through which communications can be observable, and one or more secured back channels, which cannot be publicly accessible and through which communications cannot be observable.

In some examples, communications between card 110, client device 120, server 140, database 150, and user device 160 via network 130 can occur via one or more front channels and one or more secure back channels. A front channel can be a communication protocol that employs a publicly accessible and/or unsecured communication channel such that a communication sent to card 110, client device 120, server 140, database 150, and/or user device 160 can originate from any other device, whether known or unknown to card 110, client device 120, server 140, database 150, and/or user device 160, if that device possesses the address (e.g., network address, Internet Protocol (IP) address) of card 110, client device 120, server 140, database 150, and/or user device 160. Exemplary front channels include, without limitation, the Internet, an open network, and other publicly accessible communication networks. In some examples, communications sent via a front channel can be subject to unauthorized observation by another device. In some examples, front channel communications can comprise Hypertext Transfer Protocol (HTTP) secure socket layer (SSL) communications, HTTP Secure (HTTPS) communications, and browser-based communications with a server or other device.

A secure back channel can be a communication protocol that employs a secured and/or publicly inaccessible communication channel. A secure back channel communication sent to card 110, client device 120, server 140, database 150, and/or user device 160 cannot originate from any device, and instead can only originate from a selective number of parties. In some examples, the selective number of devices can comprise known, trusted, or otherwise previously authorized devices. Exemplary secure back channels include, without limitation, a closed network, a private network, a virtual private network, an offline private network, and other private communication networks. In some examples, communications sent via a secure back channel cannot be subject to unauthorized observation by another device. In some examples, secure back channel communications can comprise Hypertext Transfer Protocol (HTTP) secure socket layer (SSL) communications, HTTP Secure (HTTPS) communications, and browser-based communications with a server or other device.

System 100 can further include a server 140. The server 140 can comprising one or more co-located or remote servers, and each server can include one or more processors coupled to memory. Server 140 can be configured as a central system, server, or platform to control and call various data at different times to execute a plurality of workflow actions. For example, the server 140 can be a dedicated server computer, such as a bladed server, or can be a personal computer, laptop computer, notebook computer, palm top computer, network computer, mobile device, or any processor-controlled device capable of supporting the system 100 and performing the functions described herein. Server 140 can be configured to connect to card 110, client device 120, database 150, and user device 160 via network 130.

System 100 can further include a database 150. The database 150 may be one or more databases configured to store date, including without limitation, private information. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 can be hosted internally by the server 140 or can be hosted externally of the server 140, such as by another server, by a cloud-based platform, or by any storage device that is in data communication with the card 110, client device 120, server 140, and user device 160, directly or via network 130. In some examples, the database 150 can containing information relating to the card chip, the card, the client device, and one or more accounts associated with the card (including transaction details for transactions involving the one or more accounts, a list of passcodes, and previously used passcodes), the client device, and the user, including private information and encryption keys.

As shown in FIG. 1, the system 100 further includes a user device 160. The user device 160 can be a network-enabled computer device. Exemplary network-enabled computer devices include, without limitation, including, a server, a network appliance, a personal computer, a workstation, a phone, a handheld personal computer, a personal digital assistant, a thin client, a fat client, an Internet browser, a mobile device, a kiosk, an automated teller machine (ATM), a cash register, or other a computer device or communications device. For example, network-enabled computer devices can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, the client device can be a contact-based card or a contactless card.

The user device 160 can include a processor 161, a memory 162, an application 163, a display 164, input devices 165, and a communication interface 166. The processor 161 can be a processor, a microprocessor, or other processor, and the user device 160 can include one or more of these processors. The processor 161 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The processor 161 can be coupled to the memory 162. The memory 162 can be a read-only memory, write-once read-multiple memory or read/write memory, e.g., RAM, ROM, and EEPROM, and client device can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times. The memory 162 can be configured to store one or more software applications, such as application 163, and other data, such as private information.

The application 113 can comprise one or more applets or one or more software applications comprising instructions for execution on the user device 160. In some examples, user device 160 can execute one or more applications, such as software applications, that enable, for example, network communications with one or more components of system 100, transmit and/or receive data, and perform the functions described herein. Upon execution by the processor 161, the application 163 can provide the functions described in this specification, specifically to execute and perform the steps and functions in the process flows described above. Such processes can be implemented in software, such as software modules, for execution by computers or other machines. The application 163 can provide graphic user interfaces (GUIs) through which user can view and interact with other components and devices within system 100. The GUIs can be formatted, for example, as web pages in HyperText Markup Language (HTML), Extensible Markup Language (XML) or in any other suitable form for presentation on a display device depending upon applications used by users to interact with the system 100.

The user device 160 can further include a display 164 and input devices 165. The display 164 can be any type of device for presenting visual information such as a computer monitor, a flat panel display, and a mobile device screen, including liquid crystal displays, light-emitting diode displays, plasma panels, and cathode ray tube displays. The input devices 165 can include any device for entering information into the user device 160 that is available and supported by the user device 160, such as a touch screen, keyboard, mouse, cursor-control device, touch screen, microphone, digital camera, video recorder or camcorder. These devices can be used to enter information and interact with the software and other devices described herein. In some examples, the display 164 and input devices 165 can be touch screens, and in some examples both the display 164 and the input devices 165 can contained within the same touch screen.

The communication interface 166 can include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The user device 160 can also support a short-range wireless communication interface, such as NFC, RFID, and Bluetooth, through communication interface 166, along with radio transmissions.

Figure 2:
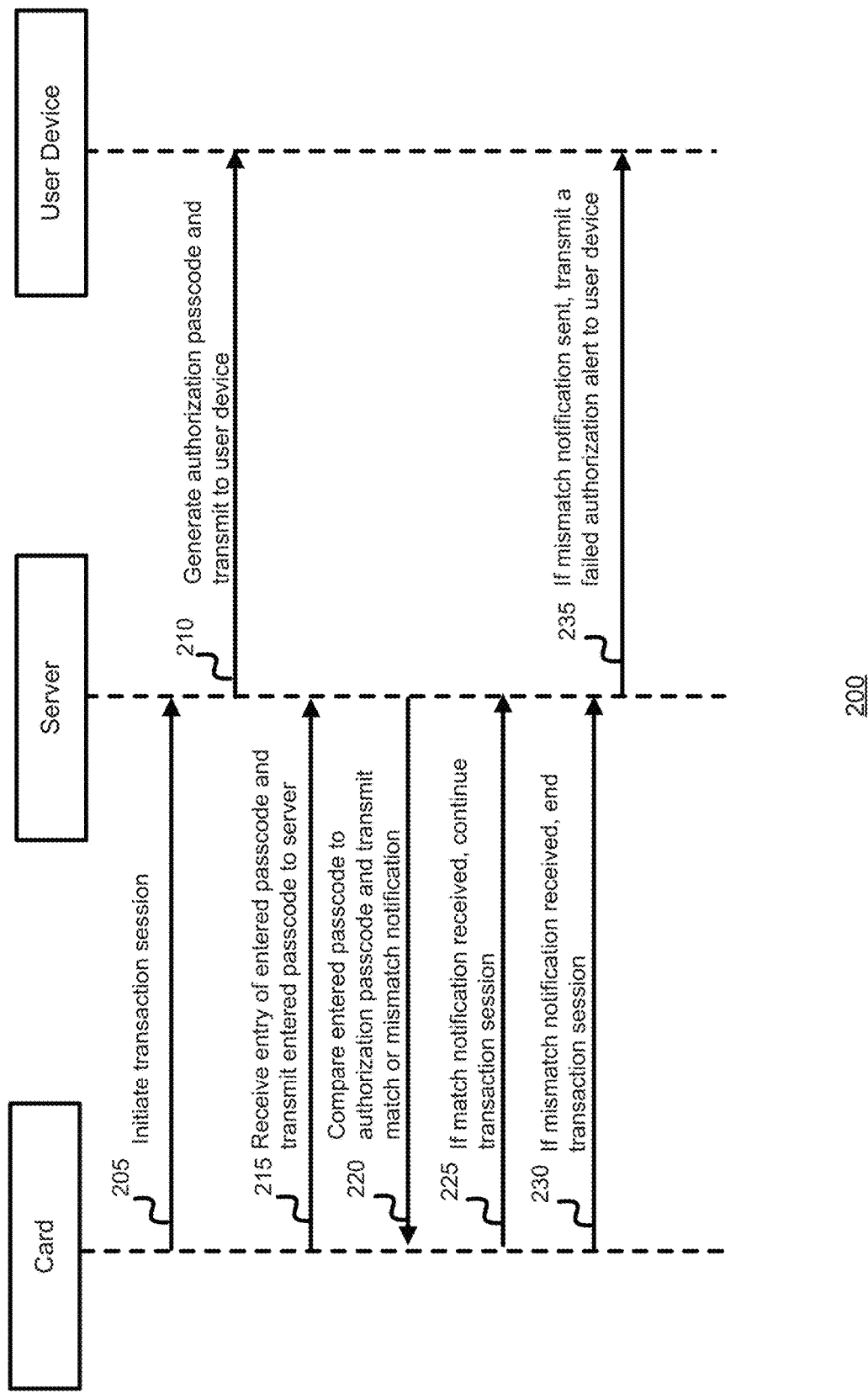
FIG. 2 illustrates a sequence diagram of a process for authorizing a transaction according to an example embodiment.

FIG. 2 illustrates a sequence diagram of a process for authorizing a transaction according to an example embodiment. FIG. 2 can reference the same or similar components as those illustrated in other figures.

As shown in FIG. 2, the process 200 can commence at step 205, where a card can initiate a transaction session. The card can initiate a transaction in one or more ways, including by being read by a contact-based card reader or by a contactless card reader. For example, for a contact-based card reader the card be swiped through a card swipe interface or inserted into a card chip reader. For a contactless card reader, the card can communicate with the reader by entering a communication field generated by the reader using, e.g., NFC, Bluetooth, Wi-Fi, RFID, or other forms of wireless communication. In some examples, the card reader can be found on a client device comprising a network-enabled computer. In some examples, the card can communicate directly with the client device or via a network, and the card can communicate with the server via the network and/or via one or more intermediary devices. Exemplary intermediary devices include, without limitation, an ATM, mobile device, tablet, laptop computer, desktop computer, wearable device, kiosk, cash register, and payment terminal including a card swipe interface or a card chip reader or in communication with an external card swipe interface or card chip reader.

In step 210, upon the initiation of the transaction session, the server can generate an authorization passcode. The passcode can be a string of one or more characters and can include one or more selected from the group of numbers, letters, and special characters (e.g., @, #, &, *). In some examples, the passcode can randomly generated, such as by a random character generator. In other examples, the passcode can be generated by an algorithm or the passcode can be a known value associated with the user, an account associated with the user, and/or the card. Once generated, the authorization passcode can be transmitted to the user device for retrieval and viewing by the user. This transmission can be directly between the server and the user device, such as through a direct data communication or through a network. In other examples, this transmission can be via a communication to a contact method associated with the user, with the card, or with the user's account, e.g., an email address, a telephone number. For example, the transmission can be made via an email, a telephone call, a short message service (SMS) text message, a multimedia message service (MMS) message, an iMessage, or a message sent via a message application, such as WhatsApp®. In other examples, the server can communicate the passcode to an application associated with the card issuing entity, such that the passcode can be retrieved as a message or displayed as a pop-up notification by the application on the user device.

In some examples, the generation/selection of the passcode can be performed by the card or by the user device associated. In these examples, the card or user device can generate or select the passcode in the same or similar manner as the server, which can include random generation, algorithmic generation, or selection of the passcode from a locally or externally stored list. The generated/selected passcode can be transmitted to the server, the selected passcode can be transmitted to the server, and/or an indication thereof can be transmitted to the server by the card, client device, and/or user device. Alternatively, in examples where a passcode is selected by the card or by the user device, the server can reference a list of known potential passcodes when evaluating the entered passcode and no communication from the card, client device, or user device to the server may be necessary. Further, if the passcode is generated or selected by the card, the generated or selected passcode or an indication thereof can be transmitted to the user device for display to facilitate entry. In other examples, the user can enter the passcode from memory. In these examples, the user can be informed of the passcode, or establish the passcode himself or herself, upon account opening or at another prior time. In other examples, one or more passcodes to activate and/or deactivate the card can be hard-coded into the memory of the card.

Once the user has retrieved and viewed the authorization passcode, the card can receive entry of the passcode by the user via the input devices in step 215. The characters entered by the user can be shown on the display of the card, to assist the user with the correct entry of the code. However, the display of the card can be configured so that the displayed characters can be visible in a direct view but not visible from a side or angled view, to improve security and hinder fraudulent actors from viewing the passcode. Fraudulent actors can also attempt to take a picture or recording of the displayed characters by mounting a camera or video recorder on the intermediary device, and reducing the side or angled visibility of the displayed characters can hinder these efforts as well. This can be accomplished by placing a polarized plastic sheet over the display. In some examples, the polarized sheet can comprise a plurality of layers, including one or more liners, polyester films, ultraviolet hard coatings, blind louver layers, anti-glare coatings, and adhesives. By doing so, the scratch resistance of the display can also be improved.

In some examples, the display and input devices of the card can facilitate the user's editing of the inputted characters. The input devices can include a backspace key and/or a delete key, in order to allow the user to remove unwanted or erroneously entered characters. The input devices can also include one or more cursor movement keys to allow a user to move to and/or select one or more characters within the entered string for removal and replacement, or for the insertion of a new character before or after an entered character. These changes, and the cursor movements, can be shown on the display. In some examples, the input devices can include an enter key that can be pressed upon completion of the entry of the passcode. In other examples, the card can detect the entry of a specific number, a minimum, or a maximum of entered characters, of the entry of some characters followed by a pause in entry of a sufficient period of time (e.g., a pause that exceeds a threshold period of time). Once the card receives entry of the passcode, the card can communicate the entered passcode to the server. In some examples, the card can communicate directly with the client device or via a network, and the card can communicate with the server via the network and/or via one or more intermediary devices. Additional information sufficient to identify, e.g., the card, the account, the user, the client device, the user device, and/or details of a transaction (e.g., monetary amount, location, date/time, merchant(s) involved, goods/services to be purchased) can also be communicated to the server. The additional information can be used to further review and authorize the transaction or to request further information or require further steps that must be completed prior to authorizing the transaction. For example, the transaction details can be compared to a minimum purchase amount, a maximum purchase amount, a spending limit, a list of identified instances of fraudulent activity, a list of merchants involved in instances of fraudulent activity, a list of locations involved in instances of fraudulent activity, and lists of goods/services subject to restrictions (e.g., age restrictions, geographic restrictions).

In step 220 the server can compare the entered passcode to the authorization passcode. In some examples, this comparison can be a direct comparison to determine whether the entered passcode completely matches the authorization passcode, and if so, the comparison can be considered successful. In other examples, the comparison can be considered successful absent a complete match, such as if the entered passcode only differs from the authorization passcode by less than a threshold number of characters or if all characters are present but are out of order by less than a threshold number of character spaces (e.g., a required combination of a first character and then a second character have been entered as the second character and then the first character). In other examples, the comparison can involve natural language processing, the application of machine learning (e.g., gradient boosting machine, logistic regression, and neural networks such as convolutional neural networks and recurrent neural networks) or other method of comparison. Based on the comparison, the server can generate a similarity score that reflects how well the entered passcode matches the authorization passcode. For example, if the similarity score indicates a complete match, or in some examples, if the similarity score exceeds a threshold score, the comparison can be considered successful. If the similarity score does not indicate a complete match, or in some examples, if the similarity score does not exceed a threshold score, the server can transmit a mismatch notification to the card. Upon determination of a successful comparison, the server can transmit a match notification, or upon determination of an unsuccessful comparison, the server can transmit a mismatch notification.

If a match notification is received by the card, the card can determine that the transaction session is valid and can continue the transaction session in step 225. If a mismatch notification is received by the card the card can end the transaction session in step 230. In some examples, if a mismatch notification is sent, the server can transmit an alert or notification to the user device that an authorization has failed in step 235. The failed authorization alert or notification can inform the user and can act as a fraud prevention measure.

In some examples, another device, e.g., the client device, the card, or the user device, can perform the comparison discussed above. In some examples, the server can transmit the match notification or mismatch notification one or more of the intermediary devices instead of, or in addition to, the card. In these examples, the one or more intermediary devices receiving the match or mismatch notification can continue or terminate the transaction session.

In some examples, one or more passcodes can be stored in the memory of the card, and the entered passcode can be checked against the one or more stored passcodes. In these examples, the same comparison described above with the respect to the server can be performed by the card. The card can continue the transaction upon determination of a match, and the card can terminate the transaction upon determination of a mismatch. In further examples, the card can generate an authorization passcode, or retrieve an authorization passcode from its memory, and transmit the authorization passcode to the user device for entry by the user as the entered passcode.

In some examples, the card can communicate the entered passcode to one or more devices, e.g., the client device, the user device, and the server. Upon receipt of the entered passcode, any such device can perform steps 220-235 of the method 200.

Figure 3A:
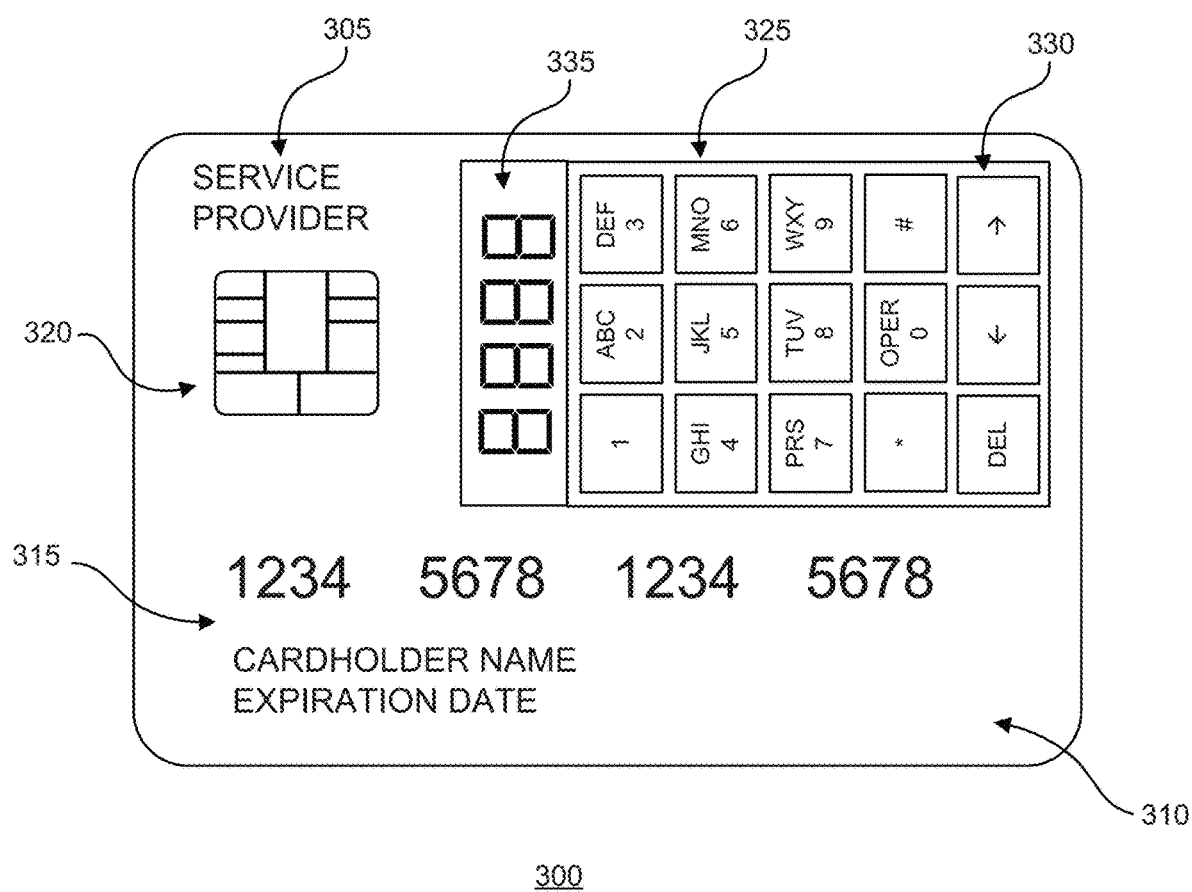
Figure 3B:
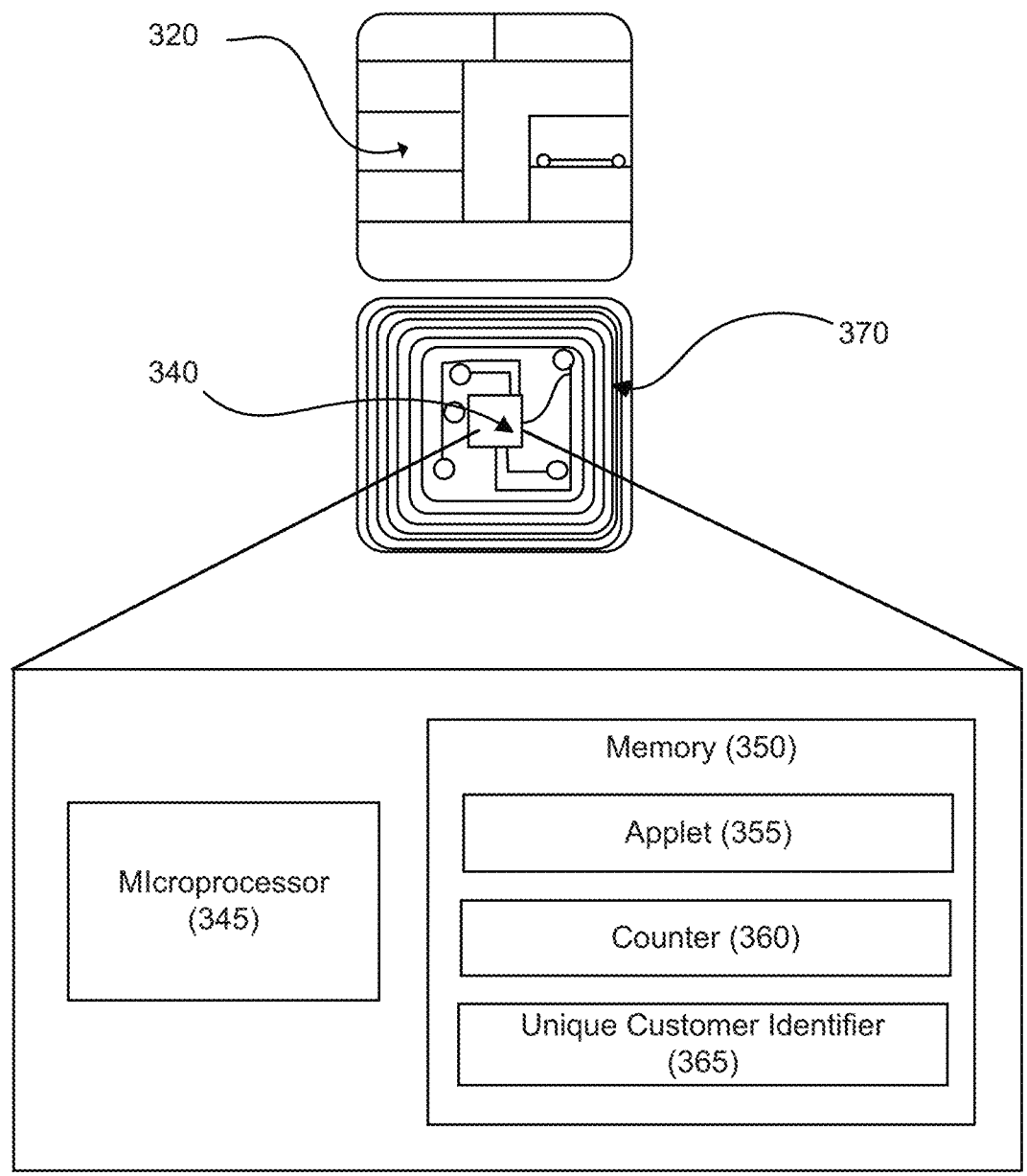

FIGS. 3A, 3B, and 3C illustrate a card according to example embodiments. In some examples, the illustrated card can be a contact-based card, and in other examples the illustrated card can be a contactless card. FIGS. 3A, 3B, and 3C can reference the same or similar components as those illustrated in other figures.

FIG. 3A illustrates an exterior view of a card 300 according to an example embodiment. In some examples, the card 300 can be a payment card, such as a credit card, debit card, or gift card, issued by an identified service provider 305 displayed on the front or back of the card 300. The card 300 can be formed of a substrate 310, which can include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In an embodiment, the card 300 can have physical characteristics compliant with the ID-1 format of the ISO/IEC 7810 standard, and the card 300 can otherwise be compliant with the ISO/IEC 14443 standard. However, it is understood that a card according to the present disclosure can have different characteristics, and the present disclosure does not require the card to be implemented in a payment card.

The card 300 can also include identification information 315 displayed on the front and/or back of the card, and a contact pad 320. The identification information can include, without limitation, an account number, a cardholder name, an expiration date, a card verification value, a security code, account management information, and a telephone number. In some examples, the contact pad 320 can function as a communication interface and can establish contact with another device, such as a smart phone, laptop, desktop, tablet computer, kiosk, ATM, and a card reader. The card 300 can also include processing circuitry, antenna and other components not shown in FIG. 3A. These components can be located behind the contact pad 320 or elsewhere on the substrate 310. The card 300 can also include a magnetic stripe or tape, which can be located on the back of the card (not shown in FIG. 3A).

The card 300 can also include an input device 325 configured for entry of information by the user into the card 300. The input device 325 can be any device supported by the card 300 including, without limitation, one or more buttons, a keypad, a touch screen, a touch pad, a stylus, a dial, a microphone, a camera, and a video recorder or camcorder. For example, as illustrated in FIG. 3A, the input device 325 can include a plurality of keys 330. The keys 330 can include keys for inputting numbers, letters, and special characters (e.g., ~, !, ^, ?, +, =). The keys 330 can further include one or more keys for the removal of characters, such as a backspace key and a delete key. The keys 330 can further include one or more keys for the movement of a cursor or other input indicator (e.g., the "arrow" keys shown in FIG. 3A). The keys 330 can further include a space key and one or more keys for the selection of characters. In some examples, the input devices 325 can comprise a microphone or other audio detection or recording device configured to receive an audio input as a manner for the entry of information, such as a user voice input or an audio file played by the user device). In some examples, the input devices 325 can comprise a camera or other device configured for image detection or capture to obtain an image as a manner for the entry of information, such as a display of an image by the user device (e.g., a bar code, quick response code, or other security image) or to capture an image of the passcode displayed by the user device. In some examples, the user device 325 can include a video recorder or camcorder for video detection and capture to obtain a video or video frame for the entry of information (e.g., a video of the user speaking the passcode, a video of a security image or security video played by the user device).

The card 300 can also include a display 335. The display 335 can include can be any type of device for presenting visual information such as a computer monitor, a flat panel display, and a mobile device screen, including liquid crystal displays, light-emitting diode displays, plasma panels, and cathode ray tube displays. In some examples, the display 335 and input devices 325 can be touch screens, and in some examples both the display 124 and the input devices 125 can contained within the same touch screen. In some examples, the display 335 can assist with the input or manipulation of characters, such as by allowing the selection of characters by touching the display and the movement of characters by dragging and dropping.

FIG. 3B illustrates an exploded view of the contact pad 320 of card 300 according to an example embodiment. As shown in FIG. 3B, the contact pad 320 can include processing circuitry 340 for storing and processing information, including a microprocessor 345 and a memory 350. It is understood that the processing circuitry 340 can contain additional components, including processors, memories, error and parity/CRC checkers, data encoders, anticollision algorithms, controllers, command decoders, security primitives and tamperproofing hardware, as necessary to perform the functions described herein.

The memory 350 can be a read-only memory, write-once read-multiple memory or read/write memory, e.g., RAM, ROM and EEPROM, and a card 300 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory 350 can store an applet 355, a counter 360, and a customer identifier 365. The applet 355 can be one or more software applications intended to execute on smart cards, such as Java Card applets. However, it is understood that the applet is not limited to Java Card applets, and instead can be any software application operable on smart cards or other devices having limited memory. The counter 360 can be a numeric counter sufficient to store an integer. The customer identifier 365 can be a unique alphanumeric identifier assigned to the user of the card 300, and this identifier can distinguish the user of the card 300 from all other card users. In some examples, the customer identifier 365 can identify both the customer and an account assigned to that customer and can further identify the specific card 300 associated with the customer's account. In some examples, the customer identifier 365 can include one or more encryption keys, such as a one or more public keys and/or one or more private keys.

The memory 350 can be divided into several zones, with each zone having a different level of security. The microprocessor 345 can keep track of which memory addresses belong to which zones and the circumstances under which each zone can be accessed. In an example embodiment, the memory 350 can be divided into four zones: a secret zone, a confidential zone, a usage zone, and a public zone.

A secret zone can be used for storage of information which can be used only by the microprocessor 345, e.g., passwords and cryptographic keys. The information stored in this zone is not readable outside of the smart card. In an embodiment, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone.

A confidential zone can be used to store a list of all transactions made with the card. The confidential zone can have password protection. In an example embodiment, the password is known only to the card issuer, who can examine the history of the card for evidence of misuse of the system. The confidential zone can have a read-only access restriction so that the information stored in this zone could not be modified, e.g., transaction list could not be modified. In another embodiment, the applet 340 and any associated memory can be firewalled from other applets stored on the card 300. In this embodiment, the applet 355 can handle the sending or receiving of any information.

A usage zone could be used for storage of information which can be periodically updated or modified. Depending on the sensitivity of the data, a password can be implemented for this zone. The usage zone can have both read and write access protected by a password.

A public zone can be used for keeping non-sensitive information, such as the card issuer's name and address, or the counter 360. The public zone can have read-only access, without a password.

The processor and memory elements of the foregoing exemplary embodiments are described with reference to the contact pad, but the present disclosure is not limited thereto. It is understood that these elements can be implemented outside of the pad or entirely separate from it, or as further elements in addition to processor and memory elements located within the contact pad.

As shown in FIG. 3B, the card 300 can include an antenna 370. In some examples, the antenna 370 can be placed within the card 300 and around the processing circuitry 340 of the contact pad 320. For example, the antenna 370 can be integral with the processing circuitry and the antenna 370 can be used with an external booster coil. As another example, the antenna 370 can be external to the contact pad 320 and the processing circuitry 340.

In an embodiment, the coil of card 300 can act as the secondary of an air core transformer. The terminal can communicate with the card 300 by cutting power or amplitude modulation. The card 300 can infer the data transmitted from the terminal using the gaps in the smart card's power connection, which can be functionally maintained through capacitors. The card 300 can communicate back by switching a load on the smart card's coil or load modulation. Load modulation can be detected in the terminal's coil through interference.

In an embodiment, the card 300 can comprise one or more chips configured to perform transactions, such as EMV chips. The one or more chips can be located within the contact pad 320 or elsewhere within the card 300, and the one or more chips can be in data communication with the processor by a plurality of pins. In some examples, the plurality of pins can be separated by an obstruction, such that data communication between the one or more chips and the processor is not possible until the obstruction is removed. The card 300 can be configured to remove the obstruction upon receipt of a match notification, thereby allowing the one or more chips to communicate with the processor and perform a transaction. Upon completion of the transaction, the card 300 can be configured to return the obstruction and separate the pins, thereby once again precluding data communication between the one or more chips and the processor.

FIG. 3C illustrates a side view of the card 300 according to an example embodiment. As shown in FIG. 3C, the substrate 310 can be formed of a plurality of substrate layers 311, 312, 313. Each of the plurality of substrate layers can comprise a single layer or a plurality of layers. Each layer can be formed of one or more materials, and exemplary materials include, without limitation, polyvinyl chloride, polyvinyl chloride acetate, acrylonitrile butadiene styrene, polycarbonate, polyesters, anodized titanium, palladium, gold, carbon, paper, and biodegradable materials (e.g., wood, bioplastic, cellulose, cork). In some examples, the substrate layers can be laminated together, held together by adhesives, or otherwise affixed together. It is understood that other compositions and combinations of materials can be used.

The substrate 310 can further include a pocket 380, and the contact pad 320 can be inserted into the pocket 375. The pocket 375 can be formed within one or more of the plurality of substrate layers (e.g., substrate layers 311, 312) and can be of sufficient height, width, and depth to accommodate the contact pad 320. The contact pad 320 can be electrically connected to the antenna 370, which can be inserted between one or more of the substrate layers (e.g., substrate layers 312, 313).

In some examples, the input devices 325 and the display 335 can be embedded within a piezoelectric layer 380. The piezoelectric layer 380 can be one of the plurality of layers of the substrate 310 and, in some examples, the piezoelectric layer can be embedded within the substrate layer 311. In some examples, a polyurethane coating 385 can be applied over the surface of the substrate layer 311 and/or the surfaces of the input devices 325 and the display 335. The polyurethane coating 385 can provide protection for the substrate layers, including water resistance and abrasion protection. In embodiments where the input devices 325 and display 335 are touch-sensitive, hydrophobic coatings, oleophobic coatings, or a combination thereof can be applied instead of the polyurethane coating and the input devices 325 and display 335 can comprise tempered glass materials embedded within the piezoelectric layer 380 and/or one or more of the substrate layers.

The desired openings for insertion of, e.g., the pocket 375, the input devices 325, and display 335, can be formed by, for example, laminating substrate layers specifically shaped to form the desired openings. As another example, openings can be formed by milling into one or more of the substrate layers. As a further example, openings can be formed by drilling, cutting, or otherwise removing material from the substrate layers.

While FIG. 1C illustrates a substrate comprising a plurality of layers, the present disclosure is not limited thereto. It is understood that, as an alternative to comprising a plurality of layers, the substrate can be a single piece of material.

Figure 4:
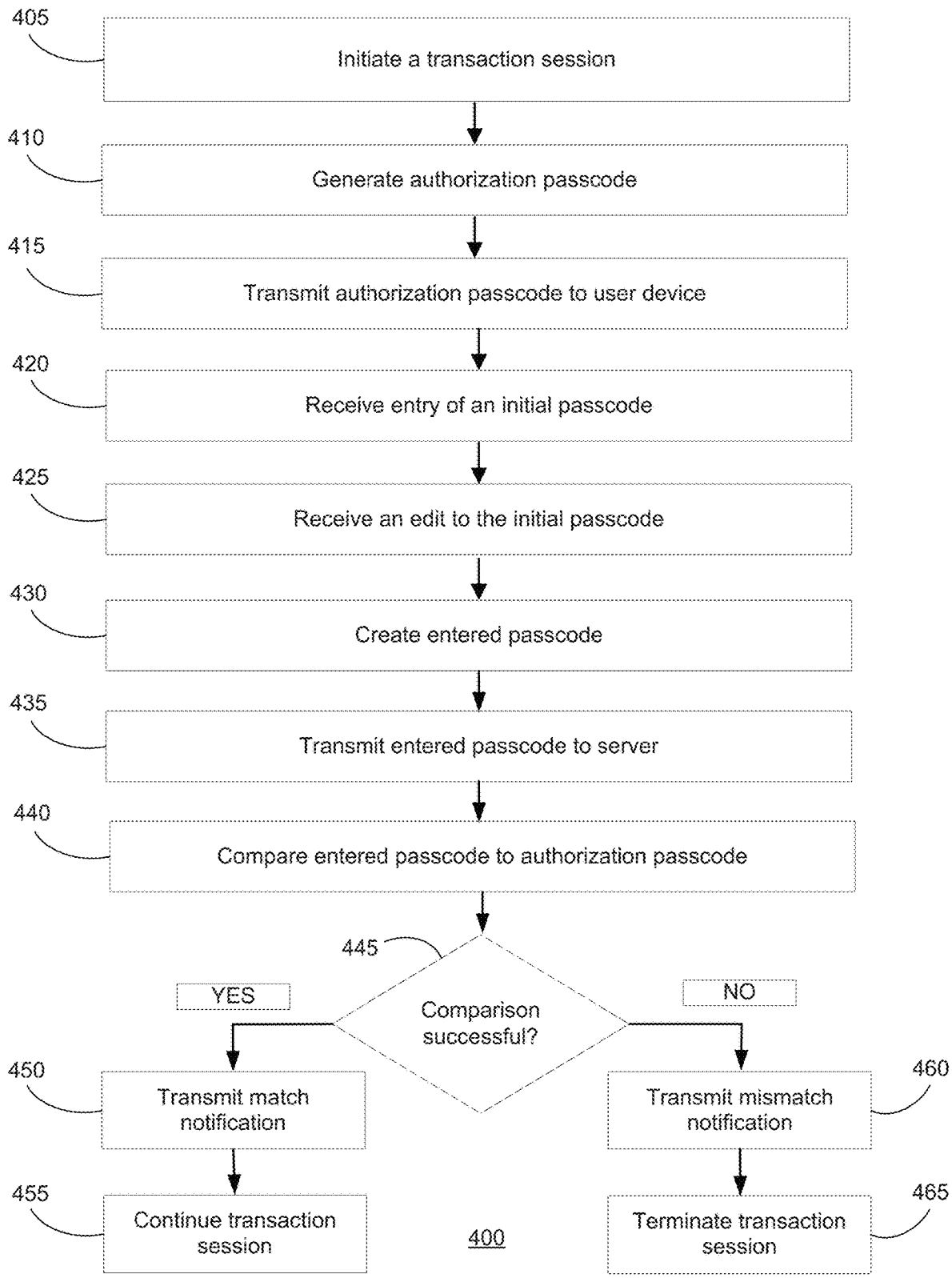
FIG. 4 is a flow chart illustrating a method of authorizing a card according to an example embodiment.

FIG. 4 is a flow chart illustrating a method of authorizing a card according to an example embodiment. FIG. 4 can reference the same or similar components as those illustrated in other figures.

As shown in FIG. 4, the method 400 can commence at block 405, where a transaction session can be initiated. The transaction session can be initiated by, for example, reading a contact-based card by a card reader installed on a client device or entry of a contactless card into a communication field of the client device. In some examples, the transaction session can be initiated by the card, and in other examples the transaction session can be initiated by a client device, and in other examples the transaction session can be initiated by the server.

In step block, the server can generate an authorization passcode. In some examples, the authorization passcode can randomly generated, such as by a random character generator. In other examples, the authorization passcode can be generated by an algorithm or the authorization passcode can be a known value associated with the user, an account associated with the user, and/or the card. In other examples, the authorization passcode can be selected from a list of authorization passcodes.

In some examples, the generation/selection of the passcode can be performed by the card or by a user device associated with the card, with the account, and/or with a user. In these examples, the card or user device can generate or select the passcode in the same or similar manner as the server, which can include random generation, algorithmic generation, or selection of the passcode from a locally or externally stored list. The generated/selected passcode can be transmitted to the server, the selected passcode can be transmitted to the server, and/or an indication thereof can be transmitted to the server by the card, client device, and/or user device. Alternatively, in examples where a passcode is selected by the card or by the user device, the server can reference a list of known potential passcodes when evaluating the entered passcode and no communication from the card, client device, or user device to the server may be necessary. Further, if the passcode is generated or selected by the card, the generated or selected passcode or an indication thereof can be transmitted to the user device for display to facilitate entry. In other examples, the user can enter the passcode from memory. In these examples, the user can be informed of the passcode, or establish the passcode himself or herself, upon account opening or at another prior time.

In block 415, the authorization passcode can be transmitted to the user device by the device (e.g., server, card, client device) that created or selected it. This transmission can be direct, such as through a direct data communication or through a network. In other examples, this transmission can be via a communication to a contact method associated with the user, with the card, or with the user's account, e.g., an email address, a telephone number. For example, the transmission can be made via an email, a telephone call, a short message service (SMS) text message, a multimedia message service (MMS) message, an iMessage, or a message sent via a message application, such as WhatsApp®. In other examples, the authorization passcode can be communicated to an application associated with the card issuing entity, such that the authorization passcode can be retrieved as a message or displayed as a pop-up notification by the application on the user device. In these examples, the user can be required to perform other verification steps (e.g., entering login credentials, account information, security information, biometric information) in order to view the authorization passcode. In examples where the authorization passcode is generated or selected by the user device, block 415 can be omitted.

In block 420, the card can receive entry of an initial passcode from the user via one or more input devices. For example, the initial passcode can be entered using one or more buttons, a keypad, a touch screen, a touch pad, a stylus, a dial, a microphone, a camera, and/or a video recorder or camcorder. In some examples, the keypad can be physical buttons on the card that can be pressed, and in other examples the buttons can appear on a touch screen. In some examples, the keys of the keypad can be physical buttons on the card that can be pressed, and in other examples the buttons can appear on a touch screen. For example, the user can press one or more keys of the keypad using a finger, a stylus, or other pointing device. As the user enters the initial passcode, the card can display on the entered characters on the display and store the entered characters in its memory.

In block 425, the card can receive one or more edits to the initial passcode. Block 425 can occur during the entry at block 420 or after the entry at block 420 is completed. For example, the user can use a combination of movement keys (and, in examples where a touch screen is used, touch inputs) and editing keys (e.g., deletion key, backspace key) to insert, remove, or otherwise edit the initial passcode. The entry of the initial passcode can be completed by, for example, pressing an "enter" key or an "OK" key, the detection that a minimum number of characters for a passcode have been entered, the detection that the maximum number of characters allowed for a passcode have been entered, the lack of a character entry or an edit to a character for a period of time greater than a threshold, and any combination thereof. In some examples, the card can perform the detection, but in other examples the client device, server, or user device can perform the detection.

Upon completion of the entry of the initial passcode, the card and/or the client device can store the initial passcode in memory as an entered passcode in block 430. The entered passcode can be stored in transient or non-transient memory. In block 435, the entered passcode can be transmitted by the card and/or the client device to the server. In some examples, the entered passcode can be communicated directly to the server, via one or more intermediary devices, and/or via a network. Additional information sufficient to identify, e.g., the card, the account, the user, the client device, the user device, and/or details of a transaction (e.g., monetary amount, location, date/time, merchant(s) involved, goods/services to be purchased) can also be communicated to the server. The additional information can be used to further review and authorize the transaction or to request further information or require further steps that must be completed prior to authorizing the transaction. For example, the transaction details can be compared to a minimum purchase amount, a maximum purchase amount, a spending limit, a list of identified instances of fraudulent activity, a list of merchants involved in instances of fraudulent activity, a list of locations involved in instances of fraudulent activity, and lists of goods/services subject to restrictions (e.g., age restrictions, geographic restrictions).

In block 440, the server can compare the entered passcode to the authorization passcode. In some examples, this comparison can be a direct comparison where a complete match is necessary for a successful verification. In other examples, the comparison can be considered successful absent a complete match under certain conditions. Exemplary conditions include, without limitation, if the entered passcode only differs from the authorization passcode by less than a threshold number of characters, and if all characters are present but are out of order by less than a threshold number of character spaces (e.g., a required combination of a first character and then a second character have been entered as the second character and then the first character). In other examples, the comparison can involve natural language processing, the application of machine learning (e.g., gradient boosting machine, logistic regression, and neural networks such as convolutional neural networks and recurrent neural networks) or other method of comparison. Based on the comparison, the server can generate a similarity score that reflects how well the entered passcode matches the authorization passcode. For example, if the similarity score indicates a complete match, or in some examples, if the similarity score exceeds a threshold score, the comparison can be considered successful. If the similarity score does not indicate a complete match, or in some examples, if the similarity score does not exceed a threshold score, the server can transmit a mismatch notification.

In block 445, the server can determine whether the comparison was successful or unsuccessful. Upon determination of a successful comparison, the method 400 can proceed to block 450 and the server can transmit a match notification to the card, the client device, the user device, or another device. Upon receipt of the match notification, in block 455, the transaction session can be considered valid and can continue.

Returning to block 445, if the server determines that the comparison is unsuccessful, the method 400 can proceed to block 460 and the server can transmit a mismatch notification to the card, the client device, the user device, or another device. Upon receipt of the mismatch notification, in block 465, the transaction session can be ended. In some examples, if a mismatch notification is sent, the server can transmit the mismatch notification to one or more devices as a fraud prevention measure. In some examples, the server can send alerts or notifications via email, messaging, pop-up notification, telephone calls, or other methods of reaching the user in order to provide further fraud protection.

It is understood that other devices receiving the entered passcode, e.g., the card, the client device, or the user device, can perform the comparison, match/mismatch notification, and transaction continuance/termination operations at blocks 440-465.

Figure 5:
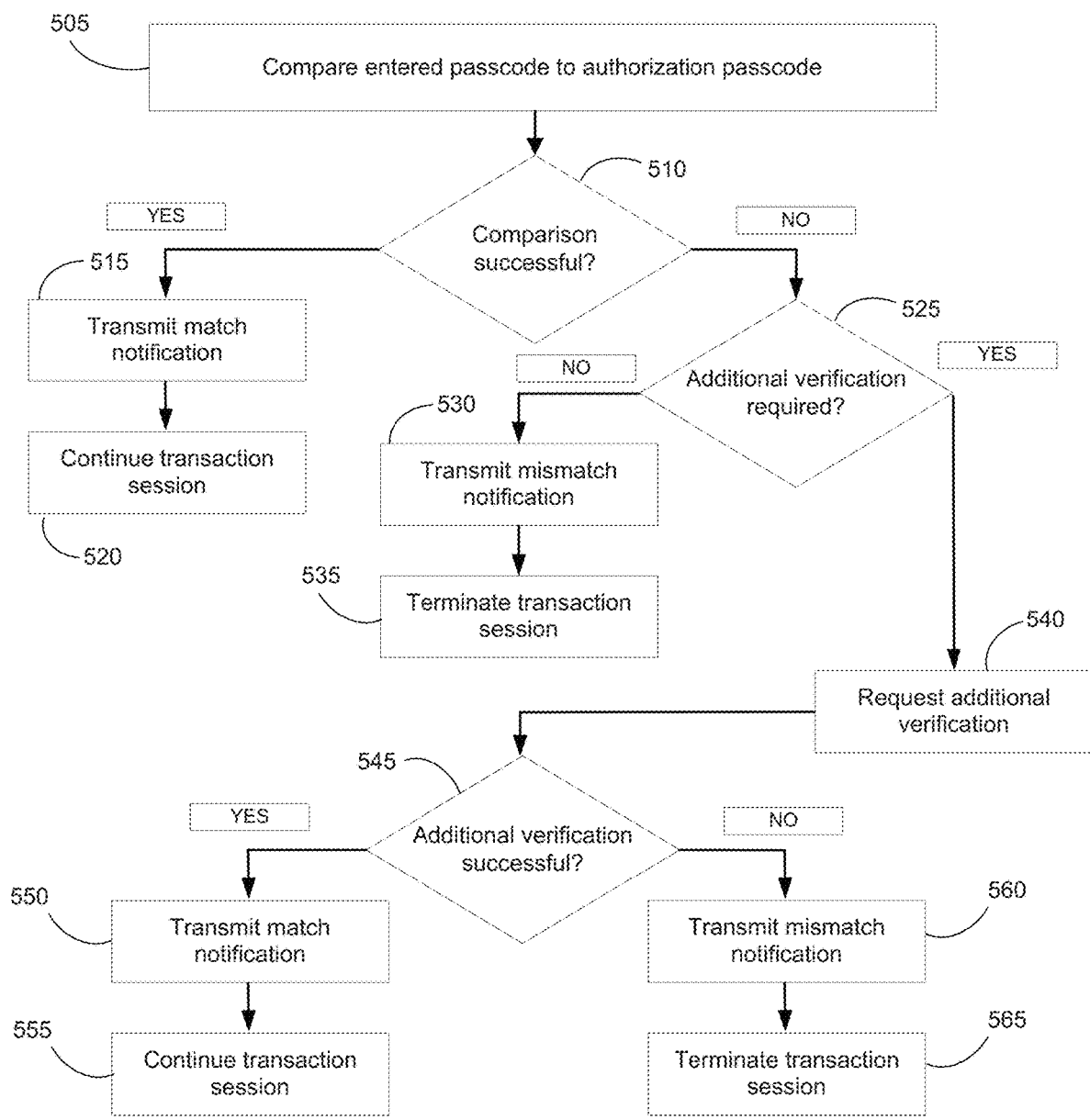
FIG. 5 is a flow chart illustrating a method of authorizing a card according to an example embodiment.

FIG. 5 is a flow chart illustrating a method of authorizing a card according to an example embodiment. FIG. 5 can reference the same or similar components as those illustrated in other figures.

As shown in FIG. 5, the method 500 can commence in block 505 with the comparison of an entered passcode, received by a card, to an authorization passcode. The entered passcode can be received by the card and transmitted to a server, a client device, a user device, or another device for performance of the comparison. In other examples, the card can perform the comparison. The selection of the authorization passcode, entry of the entered passcode on the card, and the comparison of the entered passcode to the authorization passcode can be performed in the same or similar manner as described with reference to other figures.

In block 510, the server can determine whether the comparison of the initial passcode to the authorization passcode is successful or unsuccessful. This comparison can be performed in the same or similar manner as described with respect to other figures. Upon determining that the comparison is successful, the method 500 can proceed to block 515 and the server can transmit a match notification to the card, the client device, the user device, or another device. Upon receipt of the match notification, in block 520 the transaction session can be considered valid and can continue.

Returning to block 510, if the comparison is determined to be unsuccessful, the method 500 can proceed to block 525 and the server can determine if additional verification is required. This determination can be made for a number of reasons including, for example, if the transaction details identify a particular user, account, card, merchant, location, and/or goods/services to be purchased, additional verification steps can also be required. As another example, if fraudulent or potentially fraudulent activity has previously been associated with the user, the account, the card, the merchant involved in the transaction, the location of the transaction, and/or the goods/services to be purchased, additional verification steps can be required. As another example, additional verification can be required as a default security rule in the event of an unsuccessful comparison.

If additional verification is not required, the method 500 can proceed to block 530 and the server can transmit a mismatch notification to the card, the client device, the user device, or another device. Upon receipt of the mismatch notification, in block 535, the transaction session can be ended.

In some examples, one or more additional verification steps can be required even if the comparison is successful. For example, additional verification can be required prior to authorizing all transactions as a security rule. As another example, additional verification can be required if a comparison is successful but where the entered passcode is found not to completely match the authorization passcode but is sufficiently close to the authorization passcode. As another example, additional verification can be required if a comparison is successful where the entered passcode has a similarity score above a certain threshold but is less than a complete match for the authorization passcode. Requiring additional verification steps can be a further means of reducing fraudulent activity.

Returning to block 525, if additional verification is required, the method 500 can proceed to block 540 and the server can request the provision of additional verification. The request can seek one or more verifications factors, which can include, without limitation, entry of login credentials, account information, security information, biometric information and a combination thereof (e.g., entry of a user name, a password, an account number, a security code, a one-time passcode, an answer to a security question, a fingerprint, a facial scan, a retinal scan, a voice recognition, and logging into an application or website associated with an account or card-issuing institution). The verification factors can also include a confirmation of one or more of the transaction details for the transaction seeking to be authorized. In some examples, the requested verification factors can be received via the input devices of the card or the client device. In other examples, the requested verification factors can be received via a different device, e.g., the user device and/or another device associated with the user, the user's account, or the card. In some examples, the verification request can specify the device that is to receive the requested verification factors. In some examples, verification factors input to the user device or another device can be transmitted to the card, the server, the client device, or another device.

In block 545, the server can determine whether the one or more requested verification factors were received and whether the received verification factors are correct. This determination can be made by comparing the received verification factors to verification data stored by, or available to, the server. This comparison and the determination as to whether it is successful or unsuccessful can be made in the same or similar manner as the comparison of the entered passcode to the authorization passcode described with reference to other figures.

If the determination in block 545 is that the verification is successful, the method 500 can proceed to block 550 and the server can transmit a match notification to the card, the client device, the user device, or another device. Upon receipt of the match notification, in block 555 the transaction session can continue.

Returning to block 545, if the comparison is determined to be unsuccessful, the method 500 can proceed to block 560 and the server can transmit a mismatch notification to the card, the client device, the user device, or another device. Upon receipt of the mismatch notification, in block 565, the transaction session can be ended.

In some examples, upon a determination in block 545 that the comparison is unsuccessful, the method 500 can return to block 525 and determine if an additional verification request can be made. If so, the method 500 can again proceed to block 540, and if this verification is successful, then the transaction session can be resumed or re-initiated.

It is understood that other devices receiving the entered passcode, e.g., the card, the client device, or the user device, can perform the comparison, match/mismatch notification, additional verification, and transaction continuance/termination operations at blocks 505-565.

Throughout the specification, the present disclosure refers to a card, such as a credit card. It is understood that the present disclosure includes any type of card. Exemplary cards include, without limitation, payment cards (e.g., credit cards, debit cards, gift cards), identity cards (e.g., driver's licenses, passports, tickets), membership cards, loyalty cards, access cards (e.g., employee identification cards, building security cards), account cards, data storage cards, and transportation cards (e.g., tickets, farecards, other travel documents).

Throughout the specification, the present disclosure refers to a transaction. A transaction can involve a merchant or vendor, and merchant devices or vendor devices, which can include, without limitation, retail merchants and vendors and associated devices. However, it is understood that the present disclosure is not limited thereto, and that the present disclosure includes any type of merchant, vendor, or other entity involving in card-based activities. Exemplary merchants and vendors include, without limitation, financial entities (e.g., banks, lenders, brokerages, insurers), governmental institutions, educational institutions, commercial and industrial entities such as manufacturers and retailers, any entity acting as an employer, and individual persons.

Throughout the specification, the present disclosure refers to a transaction, which can include, without limitation, a financial transaction. However, it is understood that the present disclosure is not limited thereto, and that the present disclosure includes any type of transaction, operation or activity where private information is required. Exemplary transactions include, without limitation, financial transactions (e.g., deposits, withdrawals, and transfers of funds, purchases or sale of stocks, bonds, and options), identity verification, education transactions (e.g., enrollment, request or release of academic records, tuition payments), residency verification, account transactions (e.g., account opening, account actions, account closing, card activation, card deactivation), service transactions (e.g., initiating a service, paying for a service, terminating a service), and purchase transactions (initiating a purchase, authorizing a purchase, confirming a purchase, challenging a potentially unauthorized purchase, returning a purchase, declining a purchase, and performing an age-restricted purchase).

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A card authorization system comprising:
    a card comprising a substrate, a processor, a memory, a communication interface, an input device, a display device, and a chip, wherein:
        the chip is in data communication with the processor by a plurality of pins, and
        an obstruction is placed between the plurality of pins; and
    a server in data communication with the card, the server configured to generate an authorization passcode upon an initiation of a transaction session,
    wherein, upon the initiation of a transaction session, the card is configured to:
        receive an entered passcode through the input device, display the entered passcode on the display device, and transmit the entered passcode to the server;
    wherein, upon receipt of the entered passcode, the server is configured to:
        compare the entered passcode to the authorization passcode,
        upon a determination that the entered passcode is a match for the authorization passcode, transmit a match notification indicating the transaction session is valid, and
        upon a determination that the entered passcode is a mismatch for the authorization passcode, transmit a mismatch notification terminating the transaction session; and
    wherein, upon receipt of the match notification, the card is configured to connect the plurality of pins by removing the obstruction.

2. The card authorization system of claim 1, wherein the server is configured to transmit the authorization passcode to a client device associated with the card.

3. The card authorization system of claim 1, wherein the chip is configured to conduct a transaction upon connection to the processor.

4. The card authorization system of claim 1, wherein:
    the input device comprises a plurality of keys configured for the entry of one or more characters,
    the plurality of keys includes at least one deletion key configured to delete an entered character, and
    a press of the at least one deletion key results in the removal of an entered character from the display.

5. The card authorization system of claim 4, wherein the substrate includes a piezoelectric layer and the input device is embedded within the piezoelectric layer.

6. The card authorization system of claim 4, wherein the substrate comprises a capacitive touch screen panel, the input device comprises a capacitive touch screen, and the display device comprises a capacitive touch screen.

7. The card authorization system of claim 4, wherein the substrate comprises a resistive touch screen panel, the input device comprises a resistive touch screen, and the display device comprises a resistive touch screen.

8. The card authorization system of claim 1, wherein the server is configured to terminate the transaction session upon the determination that the entered passcode is a mismatch for the authorization passcode.

9. The card authorization system of claim 1, wherein the card is configured to terminate the transaction session upon receipt of the mismatch notification.

10. The card authorization system of claim 1, wherein:
    the server is in data communication with the card via a network comprising one or more intermediary devices, and
    the one or more intermediary devices includes an Automated Teller Machine (ATM).

11. The card authorization system of claim 10, wherein the ATM is configured to end the transaction session upon receipt of the mismatch notification.

12. A method for authorizing a card comprising a substrate, a processor, a memory, a communication interface, an input device, a display device, and a chip in data communication with the processor by a plurality of pins, the method comprising:
    initiating, by the processor, a transaction session;
    receiving, by the input device, an initial passcode;
    receiving, by the input device, an edit to the initial passcode;
    creating, by the processor, an entered passcode in response to the edit to the initial passcode;
    transmitting, by communication interface, the entered passcode to a server;
    comparing, by the server, the entered passcode to an authorization passcode;
    generating, by the server and upon a determination that the entered passcode is a match for the authorization passcode, a match notification;
    transmitting, by the server, the match notification;
    receiving, by processor, the match notification; and
    connecting, by the processor, the plurality of pins by removing an obstruction located between the plurality of pins.

13. The method for authorizing a card of claim 12, further comprising:
   determining, by the server, that the entered passcode is a mismatch for the authorization passcode; and
   terminating, by the server, the transaction session.

14. The method for authorizing a card of claim 12, further comprising:
   determining, by the server, that the entered passcode is a mismatch for the authorization passcode;
   generating, by the server, a mismatch notification;
   transmitting, by the server, the mismatch notification to the card; and
   upon receipt of the mismatch notification, terminating, by the card, the transaction session.

15. The method for authorizing a card of claim 14, further comprising:
   initiating, by the card, a second transaction session;
   displaying, by the display device, a request for entry of a second initial passcode; and
   receiving, by the input devices, a second initial passcode.

16. The method for authorizing a card of claim 12, further comprising,
   prior to receipt of the initial passcode, displaying, by the input device, a swipe pattern.

17. A card authorization system comprising:
   a card comprising a substrate, a processor, a memory, a communication interface, an input device, a display device, and a chip, wherein:
   the chip is in data communication with the processor by a plurality of pins, and
   an obstruction is placed between the plurality of pins; and
   a mobile device in data communication with the card, the mobile device configured to generate an authorization passcode upon an initiation of a transaction session,
   wherein, upon the initiation of a transaction session, the card is configured to:
   receive an entered passcode through the input device,
   display the entered passcode on the display device, and
   transmit the entered passcode to the mobile device;
   wherein, upon receipt of the entered passcode, the mobile device is configured to:
   compare the entered passcode to the authorization passcode,
   upon a determination that the entered passcode is a match for the authorization passcode, transmit a match notification indicating the transaction session is valid, and
   upon a determination that the entered passcode is a mismatch for the authorization passcode, transmit a mismatch notification terminating the transaction session; and
   wherein, upon receipt of the match notification, the card is configured to connect the plurality of pins by removing the obstruction.

18. The card authorization system of claim 17, wherein the card is a contactless card and the communication interface is a near field communication interface.

19. The card authorization system of claim 17, wherein:
   the input device comprises at least one selected from the group of a capacitive touch screen and a resistive touch screen, and
   the display comprises at least one selected from the group of a capacitive touch screen and a resistive touch screen.

20. The card authorization system of claim 17, wherein:
   the substrate comprises one or more openings at least partially encompassing the input device and the display device, and
   the one or more openings are formed by at least one selected from the group of milling, drilling, and cutting.

* * * * *